(12) United States Patent
Shipman et al.

(10) Patent No.: US 9,446,813 B2
(45) Date of Patent: Sep. 20, 2016

(54) BICYCLE SHIFTER

(75) Inventors: Christopher Shipman, Chicago, IL (US); Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 715 days.

(21) Appl. No.: 11/277,249

(22) Filed: Mar. 23, 2006

(65) Prior Publication Data
US 2007/0221008 A1    Sep. 27, 2007

(51) Int. Cl.
*B62M 25/04*    (2006.01)
*B62K 23/06*    (2006.01)

(52) U.S. Cl.
CPC ............ *B62K 23/06* (2013.01); *B62M 25/04* (2013.01); *Y10T 74/20438* (2015.01)

(58) Field of Classification Search
CPC ................. B62K 23/06; B62M 25/04; Y10T 74/20287; Y10T 74/20037; Y10T 74/20438
USPC .............. 74/502.2, 501.5, 488, 489, 471.14, 74/471.15; 192/93 A, 69.7, 69.8
See application file for complete search history.

(56) References Cited

U.S. PATENT DOCUMENTS

| | | | | |
|---|---|---|---|---|
| 2,583,609 A | * | 1/1952 | Souhart | 74/489 |
| 2,999,706 A | * | 9/1961 | Wilcox | 403/370 |
| 4,462,267 A | * | 7/1984 | Shimano | 74/489 |
| 4,771,649 A | * | 9/1988 | Modolo | 74/489 |
| 5,044,213 A | * | 9/1991 | Nagano | 74/142 |
| 5,052,241 A | * | 10/1991 | Nagano | 74/502.2 |
| 5,095,768 A | * | 3/1992 | Nagano | 74/473.14 |
| 5,285,696 A | * | 2/1994 | Taylor | 74/551.1 |
| 5,287,766 A | | 2/1994 | Nagano | |
| 5,676,022 A | * | 10/1997 | Ose | 74/502.2 |
| 5,678,455 A | * | 10/1997 | Watarai | 74/473.3 |
| 5,799,542 A | * | 9/1998 | Yamane | 74/489 |
| 5,921,139 A | * | 7/1999 | Yamane | 74/473.13 |
| 6,095,309 A | * | 8/2000 | Mione | 192/217 |
| 6,494,662 B1 | * | 12/2002 | De Montalembert | 414/1 |
| 7,305,903 B2 | * | 12/2007 | Kawakami | 74/502.2 |
| 7,565,848 B2 | * | 7/2009 | Fujii | 74/473.12 |

(Continued)

FOREIGN PATENT DOCUMENTS

| | | |
|---|---|---|
| DE | 44 13 610 A1 | 11/1994 |
| EP | 0 601 211 A1 | 6/1994 |

(Continued)

OTHER PUBLICATIONS

2001 Shimano Bicycle Components Trade Sales & Support Manual, 2000, p. 135, Shimano Inc., Japan.

*Primary Examiner* — Thomas Diaz
(74) *Attorney, Agent, or Firm* — Milan Milosevic; Lisa Serdynski

(57) ABSTRACT

A bicycle shifter for pulling and releasing a control cable connected to a gear change mechanism mountable at or near an end of the handlebar that returns to a neutral position after each shift operation to decrease aerodynamic drag encountered by the rider. The shifter includes a takeup member, a control mechanism, a holding mechanism and a return assembly. The takeup member is rotatable about a shift axis for winding and unwinding the control cable thereon in a cable-pull direction and a cable-release direction. The control mechanism is movable in a first direction to rotate the takeup member in the cable-pull direction and in a second direction to rotate the takeup member in the cable-release direction. The holding mechanism retains the takeup member in a selected position and the return assembly returns the control mechanism to the neutral position after each shift operation.

32 Claims, 8 Drawing Sheets

(56) References Cited

U.S. PATENT DOCUMENTS

| | | | |
|---|---|---|---|
| 7,698,967 B2* | 4/2010 | Ording et al. | 74/551.8 |
| 2002/0012559 A1* | 1/2002 | Takahashi et al. | 400/234 |
| 2006/0130602 A1* | 6/2006 | Kawakami | 74/473.14 |

FOREIGN PATENT DOCUMENTS

| | | |
|---|---|---|
| EP | 0 810 150 A2 | 12/1997 |
| EP | 1 264 763 A2 | 12/2002 |

\* cited by examiner

BICYCLE SHIFTER

BACKGROUND OF THE INVENTION

The present invention relates to bicycle shifters and more particularly to a bicycle shifter mountable to an end of a handlebar and having a control mechanism that returns to a neutral position after each shift operation.

Bicycle racing is becoming an increasingly popular and competitive sport. One type of bicycle racing is time trials where the cyclist races against the clock for a certain distance. During these time trials, the aerodynamics of both the bicycle and rider are very important. Typically, a time trial bicycle will have hook-type handlebars. This type of handlebar is generally u-shaped with the "u" pointing in the riding direction and the end of each side of the "u" is turned upwardly. A typical shifter is mounted to the end of each side of the "u." One disadvantage of these shifters is that they increase the aerodynamic drag encountered by the rider because the lever does not return to a neutral position after each shift operation rather the neutral position of the lever changes depending on which gear is selected. Furthermore, this configuration is not ergonomic and has a complicated design. Accordingly, there is a need for a simple shifter that is mountable to an end of a handlebar that returns to an aerodynamic/ergonomic position.

SUMMARY OF THE INVENTION

The present invention provides a bicycle shifter for pulling and releasing a control cable connected to a gear change mechanism. The bicycle shifter includes a housing, a takeup member, a control mechanism, a holding mechanism and a return assembly. An attachment assembly mounts the housing at or near an end of a bicycle handlebar. The takeup member is rotatable about a shift axis for winding and unwinding the control cable thereon in a cable-pull direction and a cable-release direction. Preferably, the shift axis is substantially perpendicular to an axis of the handlebar. The control mechanism is movable in a first direction to rotate the takeup member in the cable-pull direction and in a second direction opposite the first direction to rotate the takeup member in the cable-release direction. The holding mechanism retains the takeup member in a selected position. The return assembly returns the control mechanism to a neutral position after each shift operation to decrease the aerodynamic drag encountered by the rider.

In one embodiment of the present invention, the control mechanism includes a control lever, a driver rotatably coupled to the control lever and a clutch mechanism operatively coupled to the driver for transferring the motion of the control lever to the takeup member. The control lever is rotatable about the shift axis in the first and second directions to pull and release the control cable and sweeps substantially perpendicular to the handlebar axis. The driver and clutch mechanism are configured to matingly engage. The clutch mechanism is biased toward the driver in the neutral position. In response to the actuation of the control lever, the driver axially and rotationally displaces the clutch mechanism toward the takeup member to transfer the motion of the control lever to the takeup member.

In one embodiment, the driver is rotatable about the shift axis and includes at least two teeth engageable with at least two recesses of the clutch mechanism. The driver teeth include angled surfaces corresponding to angled surfaces of the recesses of the clutch mechanism. Alternatively, the clutch mechanism may include teeth that engage recesses of the driver. The clutch mechanism is rotatable about the shift axis and includes a plurality of clutch teeth engageable with a plurality of takeup teeth of the takeup member in response to actuation of the control lever. With this configuration, when the control lever is actuated, the driver rotates, forcing the angled recesses of the clutch mechanism to move along the angled surfaces of the driver teeth causing the clutch mechanism to displace axially away from the driver toward the takeup member until the clutch teeth engage the takeup teeth. Once the takeup member stops the clutch mechanism from displacing axially, the clutch mechanism starts to rotate. Since the clutch teeth are now engaged with the takeup teeth, the takeup member also rotates.

The return assembly includes a rotational biasing member for rotationally biasing the clutch mechanism to a rotational neutral position and an axial biasing member for axially biasing the clutch mechanism to an axial neutral position away from the takeup member and toward the driver. In one embodiment, the rotational biasing member may be a torsion spring and the axial biasing member is a compression spring disposed between the clutch mechanism and the takeup member. After each shift operation, the torsion spring rotates the clutch mechanism back to its rotational neutral position and the compression spring axially displaces the clutch mechanism away from the takeup member and toward the driver to its axial neutral position The holding mechanism includes a ratchet wheel and at least one detent spring. The ratchet wheel is rotatably coupled to the takeup member and includes a plurality of teeth that correspond to gear positions of the gear change mechanism The detent spring engages the plurality of teeth to retain the ratchet wheel and the takeup member in the selected position.

These and other features and advantages of the present invention will be more fully understood from the following description of one embodiment of the invention, taken together with the accompanying drawings.

DETAILED DESCRIPTION

Figure 1:
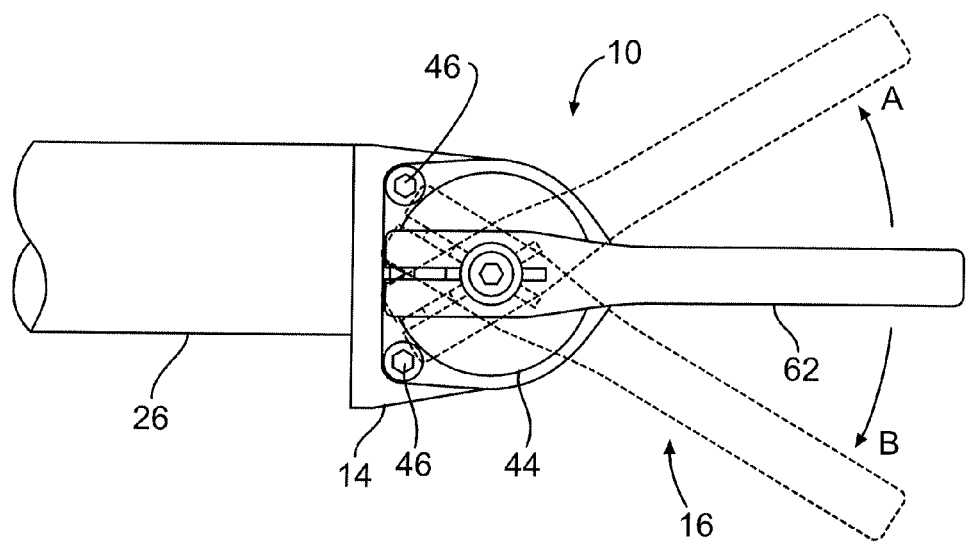
FIG. 1 is a side view of a bicycle shifter in accordance with one embodiment of the present invention.
Figure 2:
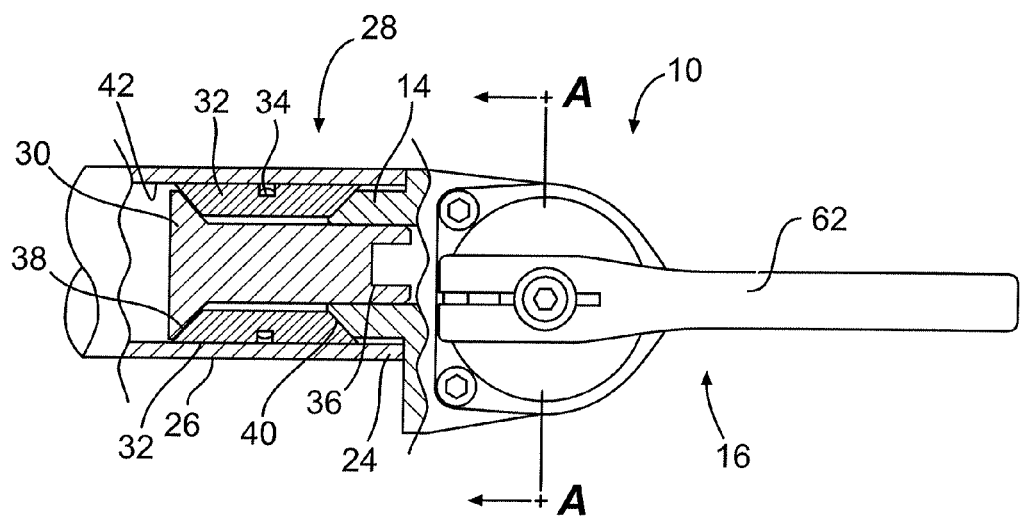
FIG. 2 is a cross-sectional side view of an attachment assembly for attaching the bicycle shifter of FIG. 1 to a handlebar.

FIGS. 1-8 illustrate a bicycle shifter 10 in accordance with one embodiment of the present invention. The bicycle shifter 10 pulls or releases a control cable 12 connected to a gear change mechanism (not shown) to shift between gear positions of the bicycle. The gear change mechanism may be a rear derailleur, a front derailleur or other similar type of mechanism. The bicycle shifter 10 is shown as a time trial shifter for a road bike, however, the shifter 10 may be used on other types of bicycles such as a mountain bike. In this embodiment, the shifter 10 generally includes a housing 14, a control mechanism 16, a takeup member 18, a holding mechanism 20 and a return assembly 22. Looking to FIG. 2, the shifter 10 is mounted at or near an end 24 of a handlebar 26 by an attachment assembly 28 inserted into the end 24 of the handlebar 26. The attachment assembly 28 includes a bolt 30 threadably connected to the shifter housing 14, three wedges 32 disposed about the bolt 30 and a wedge spring 34 disposed about the three wedges 32. The wedge spring 34 biases the wedges 32 radially inward towards the bolt. The bolt 30 includes a socket 36 for receiving a tool such as a hex wrench. To secure the shifter 10 at or near the end 24 of the handlebar 26, the tool is inserted into the socket 36 and rotated, moving the bolt 30 towards the housing 14. As the bolt 30 moves toward the housing 14, tapered surfaces 38, 40 of the bolt 30 and housing 14, respectively, deflect the wedges 32 radially outward against the inner surface 42 of the handlebar 26 securing the shifter 10 to end 24 of the handlebar 26. Of course, other assemblies for attaching the shifter 10 to the handlebar 26 may be used.

Figure 3:
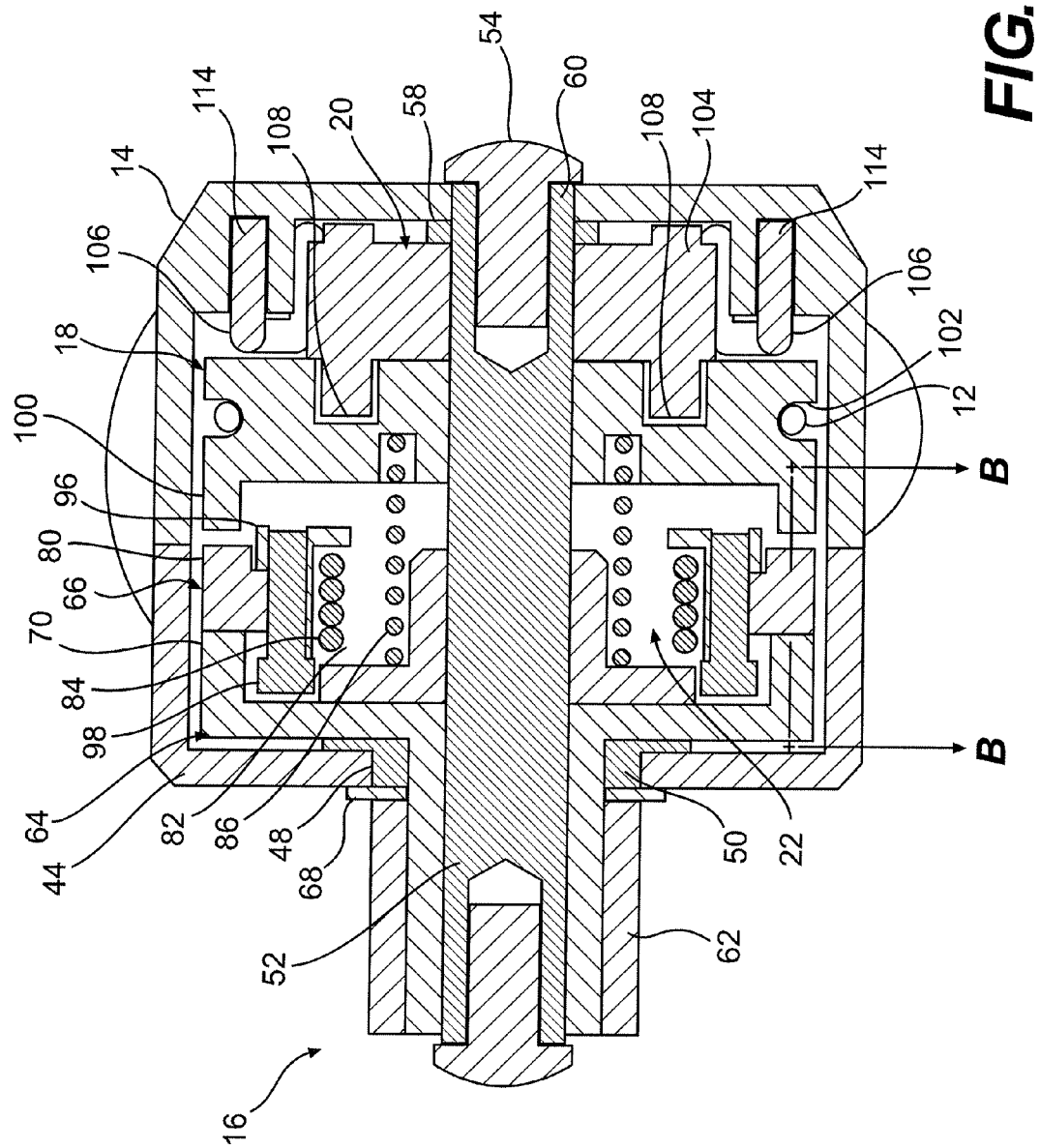
FIG. 3 is a cross-sectional view taken along line A-A of the bicycle shifter of FIG. 1.
Figure 4:
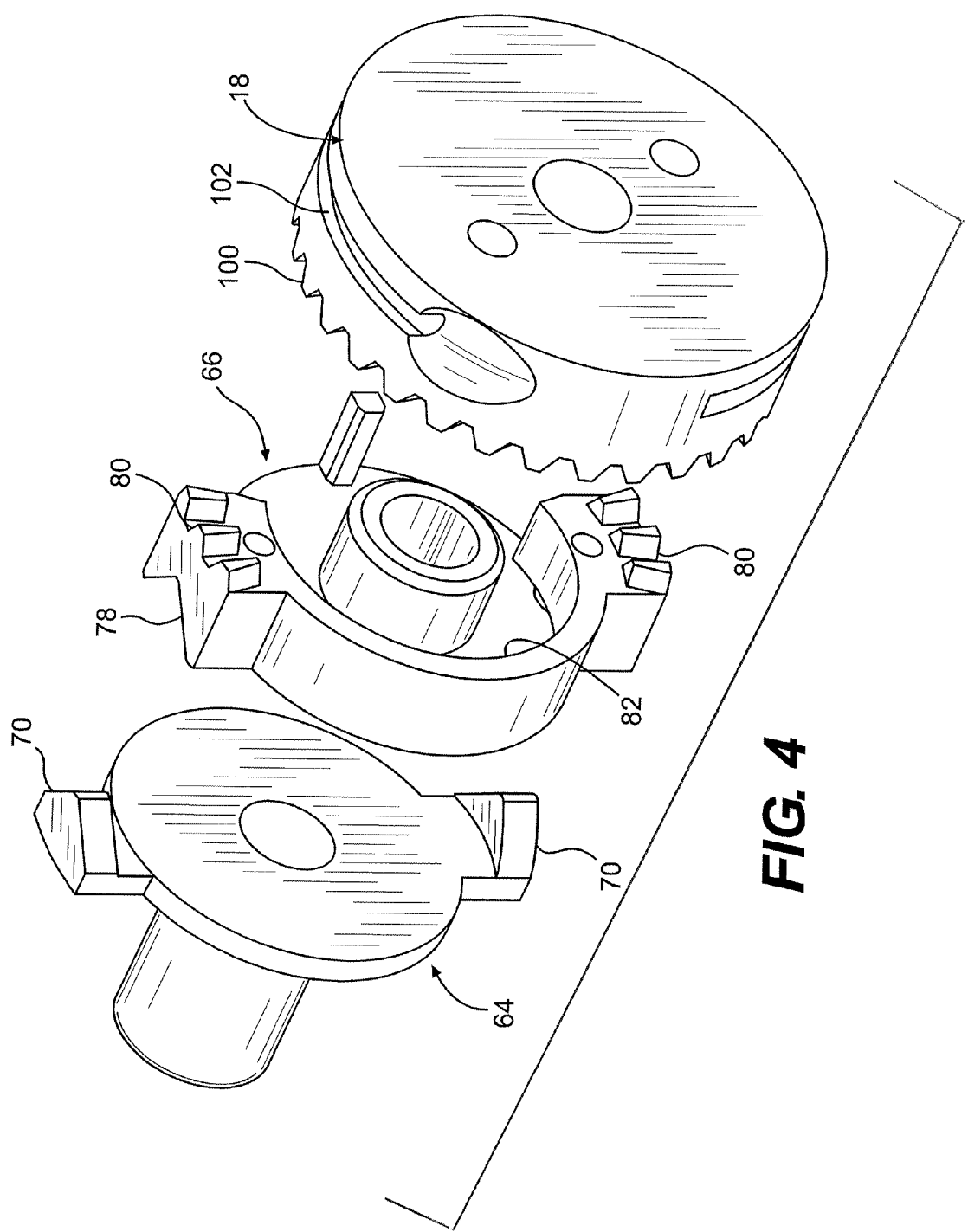
FIG. 4 is an exploded view of a driver, a clutch mechanism and a takeup member of the shifter of FIG. 1.
Figure 5:
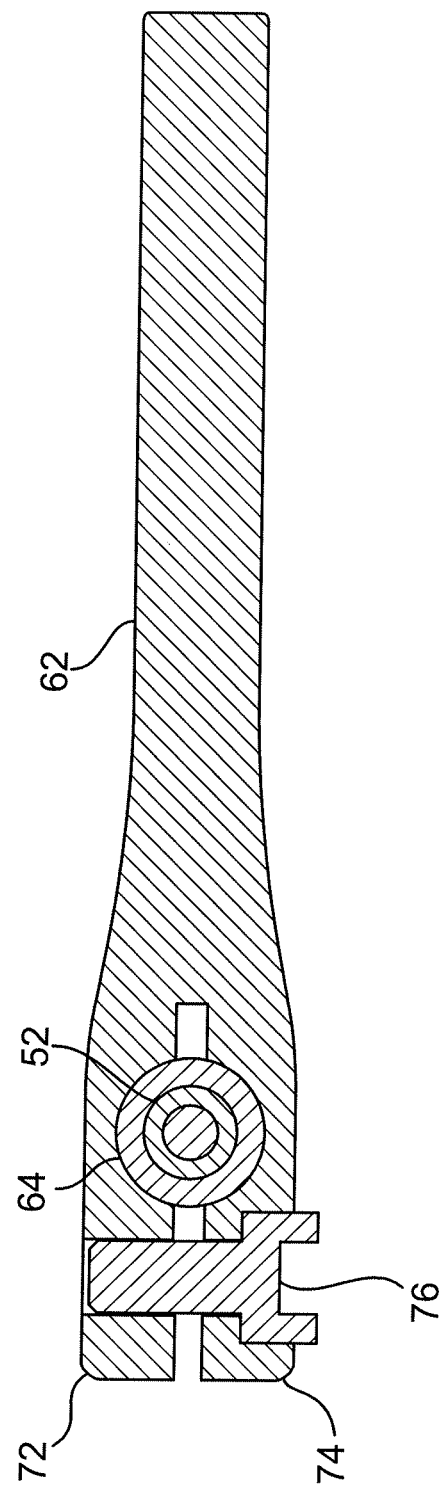
FIG. 5 is a side view of a control lever of the control mechanism of the shifter of FIG. 1.
Figure 6:
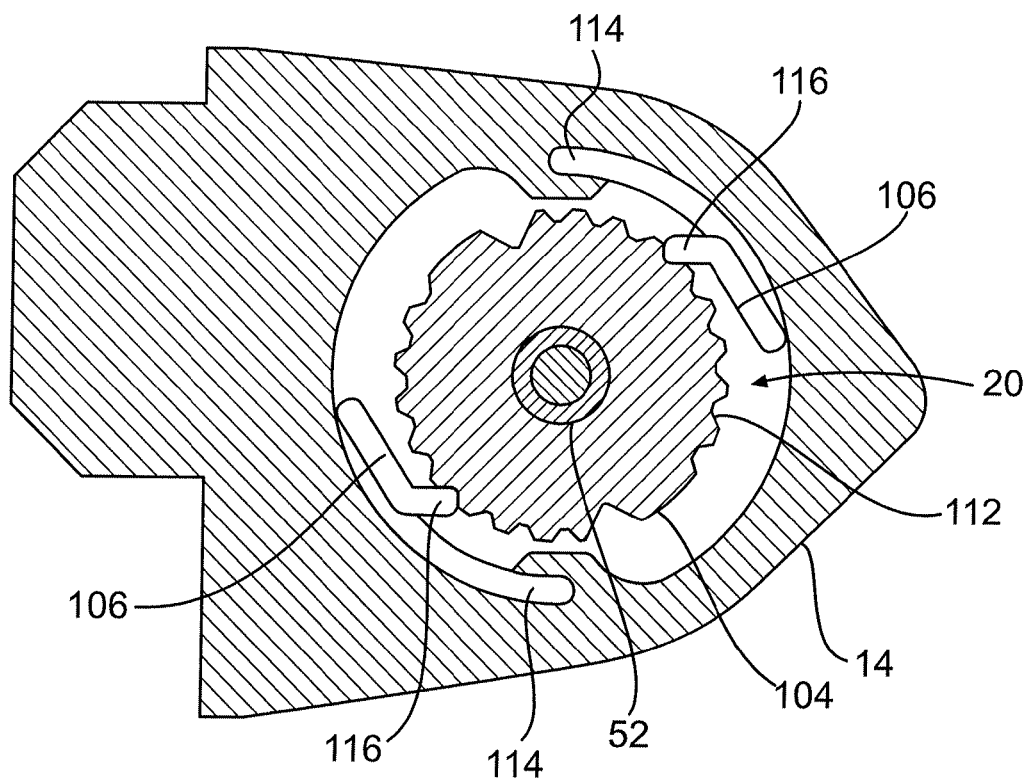
FIG. 6 is a cross-sectional view of a holding mechanism of the shifter of FIG. 1.

Looking to FIGS. 1, 3 and 4, the housing 14 includes a cover 44 screwed to the housing with three screws 46. The housing cover 44 includes a bore 48 for receiving a bushing 50. A shaft 52 extends through the housing 14 and is axially fixed relative to the housing 14 by a screw 54 threadably connected to an end 60 of the shaft 52 and a flange 58 also disposed at the end 60 of the shaft 52. The shaft 52 has a shift axis that is substantially perpendicular to an axis of the handlebar. In one embodiment of the present invention, the control mechanism 16 includes a control lever 62, a driver 64 and a clutch mechanism 66. Looking to FIG. 5, the control lever 62 is rotatable about the shaft 52 and includes first and second legs 72, 74 clamped to the driver 64 by a screw 76 extending through the first and second legs 72, 74. To secure the control lever 62 on the driver 64, the screw 76 is tightened causing the first leg 72 to move towards the second leg 74 resulting in a clamping force against the surface of the driver 64. The angular position of the control lever 62 relative to the housing 14 may be adjusted by selecting the position of the lever 62 relative to the driver 64. This configuration allows the rider to adjust a neutral position of the control lever 62.

Looking to FIGS. 3 and 4, the driver 64 extends though the bushing 50 and is rotatably mounted to the shaft 52. A thrust bushing 68 is disposed about the driver 64 between the control lever 62 and the housing cover 44. The driver 64 and clutch mechanism 66 are configured to matingly engage. The driver 64 axially and rotationally displaces the clutch mechanism 66 in response to actuation of the control lever 62. In this embodiment, the driver 64 includes two driver teeth 70 that engage the clutch mechanism 66. The clutch mechanism 66 is rotatably mounted to the shaft 52. The clutch mechanism 66 includes two recesses 78 for receiving the two driver teeth 70 and a plurality of clutch teeth 80 for engaging the takeup member 18. The driver teeth 70 have angled surfaces 77 that are matingly engaged with corresponding angled surfaces 79 of the recesses 78 when the control lever is in the neutral position, see FIG. 7b. Alternatively, the clutch mechanism may include teeth that are engageable with recesses of the driver. The clutch mechanism 66 further includes a cavity 82 for receiving the return assembly 22.

The return assembly 22 includes a rotational biasing member 84 for rotationally biasing the clutch mechanism 16 to a rotational neutral position and an axial biasing member 86 for axially biasing the clutch mechanism 16 away from the takeup member 18 to an axial neutral position. In this embodiment, the rotational biasing member 84 is a torsion spring and the axially biasing member 86 is a compression spring. Looking to FIG. 8a, the torsion spring 84 includes two legs 88, 90 that are engageable with an extension 92, in this embodiment a post extending from the clutch mechanism 66, and a projection 94 extending from the housing 14 to bias the clutch mechanism 66 toward its rotational neutral position. A spring retainer 96 is attached to the clutch mechanism 66 by two screws 98 to prevent the torsion spring 84 from axially moving relative to the clutch mechanism 66. The compression spring 86 is disposed between the clutch mechanism 66 and the takeup member 18. Looking to FIG. 7a, the compression spring biases the clutch mechanism 66 toward the driver 64 and away from the takeup member 18.

Figure 3A:
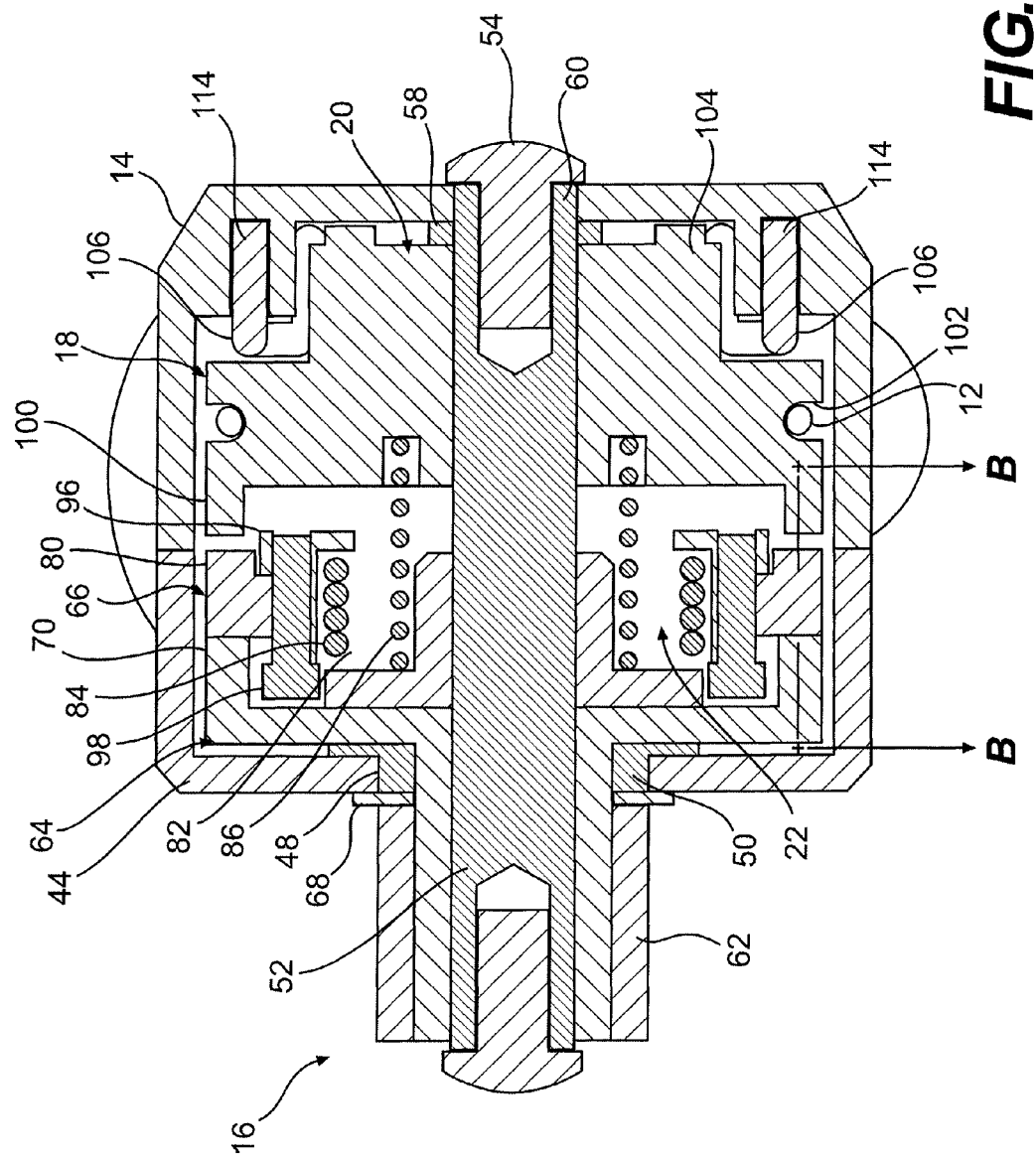
FIG. 3a is a cross-sectional view taken along line A-A of the bicycle shifter of FIG. 1 in accordance with another embodiment of the present invention.

Looking to FIGS. 3 and 4, the takeup member 18, in this embodiment a spool, is rotatably mounted to the shaft 52. The compression spring 86 biases the takeup member 18 away from the clutching mechanism. The takeup member 18 includes a plurality of takeup teeth 100 located around the periphery of the takeup member 18 for engaging the clutch teeth 80 of the clutch mechanism 66. The takeup member 18 further includes a groove 102 for receiving the control cable 12. The groove 102 extends along the periphery of the takeup member 18. The takeup member 18 is held in a selected position by the holding mechanism 20. The holding mechanism 20 includes a ratchet wheel 104 and two detent springs 106. The ratchet wheel 104 includes two projections 108 that are received in recesses 110 of the takeup member 18 to rotatably connect the ratchet wheel 104 to the takeup member 18. The projections 108 are configured such that the ratchet wheel 104 has a small amount, in this embodiment approximately four degrees, of rotational play relative to the takeup member 18. Alternatively, the takeup member 18 and ratchet wheel 104 may form one-piece, see FIG. 3a. Looking to FIG. 6, the ratchet wheel 104 is rotatably mounted to the shaft 52 and includes two sets of teeth 112 disposed about the periphery of the ratchet wheel 102. The teeth 112 on the ratchet wheel 102 correspond to gear positions of the gear change mechanism. The detent springs 106 include a first leg 114 supported by the housing and a second leg 116 engageable with the teeth 112 of the ratchet wheel 104 to retain the takeup member in the selected position.

Figure 7A:
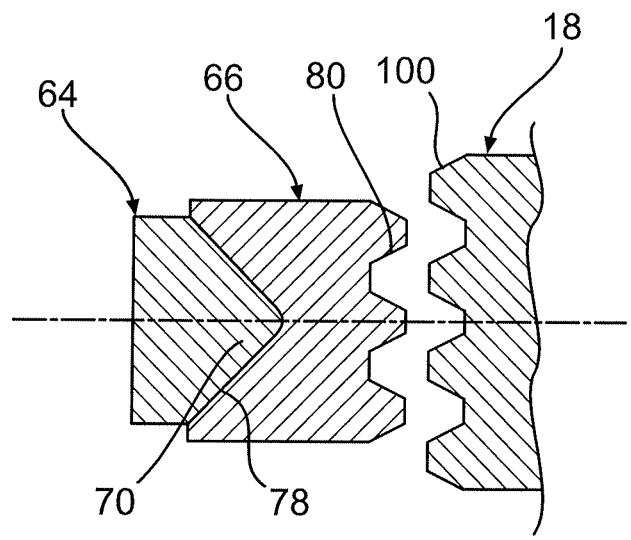
FIG. 7a is a partial cross-sectional view taken along line B-B of the bicycle shifter of FIG. 3 showing the positions of the driver, clutch mechanism and the takeup member when the shifter is in a neutral position.
Figure 7B:
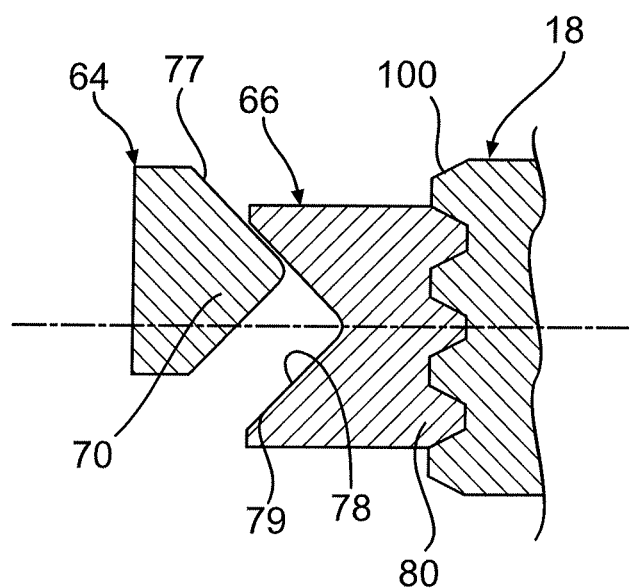
FIG. 7b is a partial cross-sectional view taken along line B-B of the bicycle shifter of FIG. 3 showing the positions of the driver, clutch mechanism and the takeup member during a shifting operation.
Figure 8A:
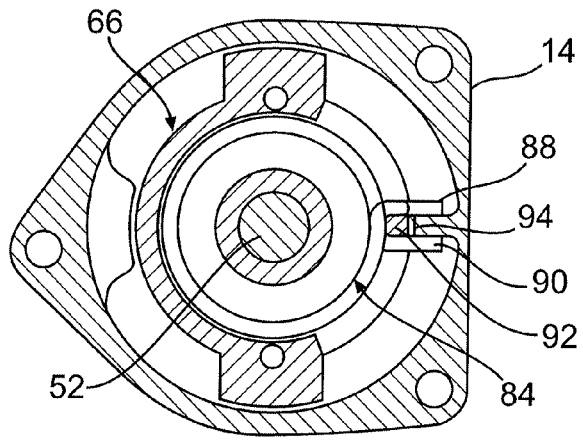
FIG. 8a is cross-sectional view of the clutch mechanism and a rotational biasing member of the shifter of FIG. 1 when the shifter is in a rotational neutral position.
Figure 8B:
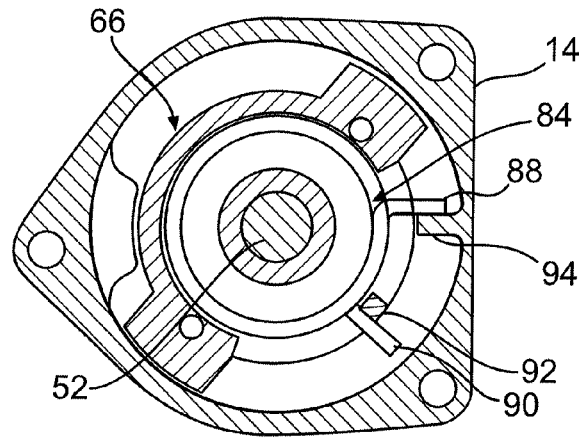
FIG. 8b is a cross-sectional view of the clutch mechanism and the rotational biasing member of the shifter of FIG. 1 during a cable-pull operation.
Figure 8C:
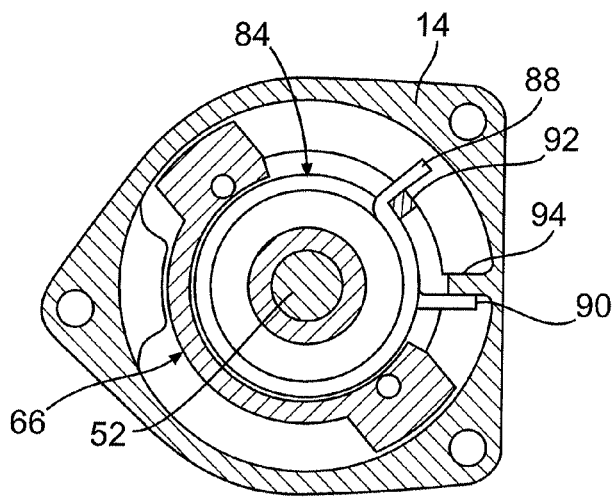
FIG. 8c is a cross-sectional view of the clutch mechanism and the rotational biasing member of the shifter of FIG. 1 during a cable-release operation.

At rest the control lever 62 is located in a neutral position as shown in FIG. 1. When the control lever 62 is in the neutral position, the clutch mechanism 66 is biased away from the takeup member 18 by the compression spring 86 as shown in FIG. 7a and is biased rotationally to the neutral position by the torsion spring 84 as shown in FIG. 8a. To shift the gear change mechanism, the control lever 62 is rotated in a first direction A to pull the control cable and in a second direction B to release the control cable. When the control lever 62 is rotated in the cable-pull direction, the driver 64 rotates with the control lever 62 and as the driver teeth 70 of the driver 64 rotate, the recesses 78 of the clutch mechanism 66 move along angled surfaces 77 of the driver teeth 70, axially displacing the clutch mechanism 66 toward the takeup member 18 until the clutch teeth 80 of clutch mechanism 66 engage the takeup teeth 100 of the takeup member 18 as shown in FIG. 7b. Once the clutch mechanism 66 is prevented from displacing any further in the axial direction by the takeup member 18, the extension 92 of the clutch mechanism 66 exerts a force against the leg 90 of the torsion spring 84 overcoming the biasing force of the torsion spring 84 and rotating the clutch mechanism 66 in the cable-pull direction, see FIG. 8b. Since the clutch teeth 80 are now engaged with the takeup teeth 100, the takeup member 18 and ratchet wheel 104 also rotate in the cable-pull direction resulting in the detent springs 106 to engage a next tooth on the ratchet wheel 104 corresponding to the next gear position of the gear change mechanism. If the rider wanted to shift more than one gear at a time in the cable-pull direction, the rider would continue to rotate the control lever until the desired gear position was reached. With this configuration, the rider may shift multiple gears in the cable-pull direction with a single stroke of the control lever 62.

After the control lever 62 is released, the driver 64 no longer exerts a force against the clutch mechanism 66 and the biasing force of the compression spring 86 causes the clutch mechanism 66 to displace away from the takeup member 18 back to its axial neutral position and the biasing force of the torsion spring 84 causes the clutch mechanism 66 to rotate back to its rotational neutral position as shown in FIG. 8a. Since the clutch mechanism 66 is coupled with the driver 64 and the driver 64 is coupled with the control lever 62, the driver 64 and the control lever 62 also return to their neutral positions. The takeup member 18 is retained in its current position by the detent springs 106 engaging the ratchet wheel teeth 112.

When the control lever 62 is rotated in the cable-release direction, similar to the cable-pull operation, the driver 64 rotates with the control lever 62 and as the driver teeth 70 rotate, the recesses 78 of the clutch mechanism 66 move along the angled surfaces 77 of the drive teeth 70 axially displacing the clutch mechanism 66 toward the takeup member 18 until the clutch teeth 80 of the clutch mechanism 66 engage the takeup teeth 100 of the takeup member 18. Looking to FIG. 8c, once the clutch mechanism 66 is prevented from displacing any further in the axial direction by the takeup member 18, the extension 92 of the clutch mechanism 66 exerts a force against the leg 88 of the torsion spring 84 overcoming the biasing force of the torsion spring 84 and rotating in the cable-release direction. The takeup member 18 and ratchet wheel 104 rotate in the cable-release direction resulting in the detent springs 106 engaging a next tooth in the cable-release direction. If the rider wanted to shift more than one gear at a time in the cable-release direction, the rider would continue to rotate the control lever 62 until the desired gear position was reached. With this configuration, the rider may shift multiple gears in the cable-release direction with a single stroke of the control lever 62. Similar to the cable-pull operation, after the release of the control lever 62, the driver 64, clutch mechanism 66 and the control lever 62 return to their neutral position and the takeup member 18 is retained in its current position.

While this invention has been described in reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A bicycle shifter for pulling and releasing a control cable connected to a gear change mechanism, the bicycle shifter comprising:
    a housing configured to mount to a distal end of a handlebar having an axis;
    a takeup member configured to pull and release the control cable;
    a control mechanism including a single control lever rotated about a shift axis in a first direction to displace the takeup member to pull the control cable to cause a first shift operation, the single control lever rotated about the shift axis in a second direction to displace the takeup member to release the control cable to cause a second shift operation, the control mechanism including a driver rotatably coupled to the control lever;
    a holding mechanism for retaining the takeup member in a selected position; and
    a return assembly for returning the single control lever to a neutral position after the first shift operation and the second shift operation,
    at least a portion of the single control lever in the neutral position extending substantially parallel to the axis of the handlebar in the direction beyond the distal end of the handlebar, wherein the control mechanism is adjustable to modify the neutral position to an adjusted neutral position by adjusting the angular position about the shift axis of the single control lever relative to the axis of the handlebar, and wherein the return assembly is configured to return the single control lever to the adjusted neutral position after the first shift operation and the second shift operation,
    wherein the control mechanism includes a clutch mechanism operatively coupled to the driver, the clutch mechanism rotatable about the shift axis and axially displaceable to engage the takeup member in response to the actuation of the control lever.

2. The bicycle shifter of claim 1, wherein the takeup member is rotatable about the shift axis substantially perpendicular to the axis of the handlebar.

3. The bicycle shifter of claim 1, wherein the return assembly includes a rotational biasing member and an axial biasing member, the rotational biasing member rotationally biases the clutch mechanism to a rotational neutral position and the axial biasing member axially biases the clutch mechanism to an axial neutral position away from the takeup member and toward the driver.

4. The bicycle shifter of claim 3, wherein the clutch mechanism includes an extension, the housing includes a projection and the rotational biasing member is a torsion spring, the torsion spring engageable with the projection and the extension to bias the clutch mechanism toward the rotational neutral position.

5. The bicycle shifter of claim 4, wherein the torsion spring includes first and second ends, one of the first and second ends engageable with the extension and the other one of the first and second ends engageable with the projection.

6. The bicycle shifter of claim 3, wherein the axial biasing member is a compression spring disposed between the clutch mechanism and takeup member.

7. The bicycle shifter of claim 1, wherein the driver and the clutch mechanism configured to matingly engage, the driver axially and rotationally displacing the clutch mechanism in response to actuation of the single control lever.

8. The bicycle shifter of claim 7, wherein one of the driver and the clutch mechanism includes at least two teeth and the other one of the driver and the clutch mechanism includes at least two recesses for receiving the teeth.

9. The bicycle shifter of claim 8, wherein the at least two teeth have angled surfaces and the recesses have corresponding angled surfaces matingly engageable with the angled surfaces of the teeth.

10. The bicycle shifter of claim 1, wherein the takeup member includes a plurality of takeup teeth and the clutch mechanism includes a plurality of clutch teeth engageable with the plurality of takeup teeth to rotate the takeup member about the shift axis in response to actuation of the single control lever, the clutch teeth biased away from the takeup teeth when the single control lever is in the neutral position.

11. The bicycle shifter of claim 1, wherein the single control lever is clamped to the driver.

12. The bicycle shifter of claim 1, wherein the holding mechanism includes a ratchet wheel rotatable with the takeup member and at least one detent spring, the ratchet wheel having a plurality of teeth, the at least one detent spring engageable with the plurality of teeth of the ratchet wheel to retain the takeup member in the selected position.

13. The bicycle shifter of claim 12, wherein the at least one detent spring has first and second ends, one of the first and second ends supported by the housing and the other one of the first and second ends engageable with the teeth of the ratchet wheel.

14. The bicycle shifter of claim 12, wherein the takeup member includes recesses and the ratchet wheel includes projections engageable with the recesses to rotatably couple the ratchet wheel to the takeup member.

15. The bicycle shifter of claim 12, wherein the ratchet wheel and the takeup member are integral.

16. The bicycle shifter of claim 1 further comprising an attachment assembly inserted into the distal end of the handlebar.

17. A bicycle shifter for pulling and releasing a control cable connected to a gear change mechanism, the bicycle shifter comprising:
a housing mountable to a distal end of a handlebar having an axis;
a takeup member rotatable about a shift axis for winding and unwinding the control cable thereon in a cable-pull direction and a cable-release direction;
a control mechanism including a control lever rotatable in a first direction to rotate the takeup member in the cable-pull direction, the control lever rotatable in a second direction to rotate the takeup member in the cable-release direction, the control mechanism including a clutch mechanism axially displaceable to engage the takeup member in response to actuation of the control lever to transfer the motion of the control lever to the takeup member, the control mechanism including a driver rotatably coupled to the control lever and operatively coupled to the clutch mechanism, the clutch mechanism rotatable about the shift axis, the control lever rotatable about the shift axis;
a holding mechanism for retaining the takeup member in a selected position; and
a return assembly for returning the control mechanism to a neutral position after each shift operation, at least a portion of the control lever in the neutral position extending substantially parallel to the axis of the handlebar in the direction beyond the distal end of the handlebar, and wherein the neutral position is adjustable relative to the axis of the handlebar by adjusting the angular position of the control lever relative to the driver such that the aerodynamic drag of the control lever in the neutral position is reduced.

18. The bicycle shifter of claim 17, wherein the shift axis is substantially perpendicular to the axis of the handlebar.

19. The bicycle shifter of claim 17, wherein the return assembly includes a rotational biasing member and an axial biasing member, the rotational biasing member rotationally biases the clutch mechanism to a rotational neutral position and the axial biasing member axially biases the clutch mechanism to an axial neutral position away from the takeup member and toward the driver.

20. The bicycle shifter of claim 19, wherein the clutch mechanism includes an extension, the housing includes a projection and the rotational biasing member is a torsion spring, the torsion spring engageable with the projection and the extension to bias the clutch mechanism toward the rotational neutral position.

21. The bicycle shifter of claim 20, wherein the torsion spring includes first and second ends, one of the first and second ends engageable with the extension and the other one of the first and second ends engageable with the projection.

22. The bicycle shifter of claim 19, wherein the axial biasing member is a compression spring disposed between the clutch mechanism and takeup member.

23. The bicycle shifter of claim 17, wherein the driver and the clutch mechanism configured to matingly engage, the driver axially and rotationally displacing the clutch mechanism in response to the actuation of the control lever.

24. The bicycle shifter of claim 23, wherein one of the driver and the clutch mechanism includes at least two teeth and the other one of the driver and the clutch mechanism includes at least two recesses for receiving the teeth.

25. The bicycle shifter of claim 24, wherein the at least two teeth have angled surfaces and the recesses have corresponding angled surfaces matingly engageable with the angled surfaces of the teeth.

26. The bicycle shifter of claim 17, wherein the takeup member includes a plurality of takeup teeth and the clutch mechanism includes a plurality of clutch teeth engageable with the plurality of takeup teeth to rotate the takeup member about the shift axis in response to actuation of the control lever, the clutch teeth biased away from the takeup teeth when the control mechanism is in the neutral position.

27. The bicycle shifter of claim 17, wherein the control lever is clamped to the driver.

28. The bicycle shifter of claim 17, wherein the holding mechanism includes a ratchet wheel rotatable with the takeup member and at least one detent spring, the ratchet wheel having a plurality of teeth, the at least one detent spring engageable with the plurality of teeth of the ratchet wheel to retain the takeup member in the selected position.

29. The bicycle shifter of claim 28, wherein the at least one detent spring has first and second ends, one of the first and second ends supported by the housing and the other one of the first and second ends engageable with the teeth of the ratchet wheel.

30. The bicycle shifter of claim 28, wherein the takeup member includes recesses and the ratchet wheel includes projections engageable with the recesses to rotatably couple the ratchet wheel to the takeup member.

31. The bicycle shifter of claim 28, wherein the ratchet wheel and the takeup member are integral.

32. The bicycle shifter of claim 17 wherein the entire length of the control lever extends in the direction of the axis of the handlebar at the distal end of the handlebar.

* * * * *